(12) United States Patent
Khoshnevis

(10) Patent No.: US 6,589,471 B1
(45) Date of Patent: Jul. 8, 2003

(54) SELECTIVE INHIBITION OF BONDING OF POWER PARTICLES FOR LAYERED FABRICATION OF 3-D OBJECTS

(75) Inventor: Behrokh Khoshnevis, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 339 days.

(21) Appl. No.: 09/698,541
(22) Filed: Oct. 26, 2000

Related U.S. Application Data
(60) Provisional application No. 60/161,695, filed on Oct. 26, 1999.

(51) Int. Cl.[7] ............................ B29C 35/08; B29C 41/02
(52) U.S. Cl. .................. 264/497; 264/308; 425/135; 425/174.4
(58) Field of Search .................. 264/308, 401, 264/497; 425/135, 174.4

(56) References Cited

U.S. PATENT DOCUMENTS 5,518,680 A * 5/1996 Cima et al. ............. 264/497 X

* cited by examiner

Primary Examiner—Leo B. Tentoni
(74) Attorney, Agent, or Firm—Fish & Richardson P.C.

(57) ABSTRACT

A method for fabricating a three-dimensional (3-D) object is disclosed. The method includes providing a layer of powder material, and selectively depositing bonding inhibitor on selected areas of the layer of powder material. The areas to be deposited with the bonding inhibitor are selected according to a cross-section design of the 3-D object. The method also includes promoting bonding of uninhibited areas of the entire layer of powder material by either sintering or balk deposition of chemical binders. The method further includes repeating the steps of providing a layer of powder material, selectively depositing bonding inhibitor, and promoting bonding until the 3-D object is formed.

36 Claims, 4 Drawing Sheets

SELECTIVE INHIBITION OF BONDING OF POWER PARTICLES FOR LAYERED FABRICATION OF 3-D OBJECTS

CROSS REFERENCE TO RELATED APPLICATION

This application claims the benefit of the priority of U.S. Provisional Application No. 60/161,695, filed on Oct. 26, 1999, and entitled Radiation Sintering.

BACKGROUND

The present disclosure generally relates to fabrication of three-dimensional objects, and more specifically, to selective inhibition of bonding for layered fabrication of such objects.

Three-dimensional (3-D) objects, such as prototype parts, may be produced directly from computer-aided design databases. Various technologies are known to produce such objects, particularly through the use of layered additive processes. One of these processes (SLS) works by depositing and heating powder material at selected locations, to bond the material to the layer below. Commercially adapted methods of layered manufacturing use various forms of materials. For example, stereolithography (STL) uses a resin called photopolymer that is selectively hardened by a laser beam delivering UV light at desirable spots on each thin resin layer. Fused Deposition Method (FDM) uses a plastic filament that is forced through a hot nozzle that deposits the material to form each layer. Laminated Object Manufacturing (LOM) laminates cut sheets of a special paper to create 3D parts. Selective Laser Sintering (SLS) selectively bonds powdered material using laser. The powder material may include polymer, ceramic, or metal. Another method referred to as Three-Dimensional Printing uses adhesive droplets deposited on each thin powder layer to create bonding of powder particles in selected spots of each layer.

However, the above-described methods for layered manufacturing present difficulties with respect to time, cost, and quality of the produced 3-D objects. For example, those methods that use a laser incur the high cost:of the laser and the low scanning speed due to relatively wide cross-section area per layer for sintering compared to the beam size. For other methods, difficulties lie in tediously slow process of scanning the entire volume of the object, layer by layer, by sintering or other fusion process. Furthermore, when sintering or heating a selected area, a relatively uniform temperature needs to be maintained on the powder surface in order to prevent deformations.

SUMMARY

In recognition of the above-described difficulties, the inventor recognized the need for a 3-D fabrication of objects that provide faster and cheaper method and system than the conventional method.

In one aspect, the present disclosure describes a method for fabricating a three-dimensional (3-D) object. The method includes providing a layer of powder material, and selectively depositing bonding inhibitor on selected areas of the layer of powder material. The areas to be deposited with the bonding inhibitor are selected according to a cross-section design of the 3-D object. The method also includes a step of promoting bonding of uninhibited areas of the entire layer of powder material. The method further includes repeating the steps of providing a layer of powder material, selectively depositing bonding inhibitor, and promoting bonding of uninhibited areas until the 3-D object is formed.

In another aspect, the method includes a step of providing a layer of powder material, and selectively depositing bonding inhibitor on selected areas of the layer of powder material. The areas to be deposited with the bonding inhibitor are selected according to a cross-section design of the 3-D object. The method also includes repeating the steps of providing a layer of powder material and selectively depositing bond inhibitor, until entire programmed layers of the 3-D object has been deposited. The entire programmed layers of the 3-D object may then be sintered in a sintering oven.

In further aspects, the present disclosure describes apparatuses configured to perform the above-described methods.

BRIEF DESCRIPTION OF THE DRAWINGS

Different aspects of the disclosure will be described in reference to the accompanying drawings wherein.

DETAILED DESCRIPTION

Figure 1:
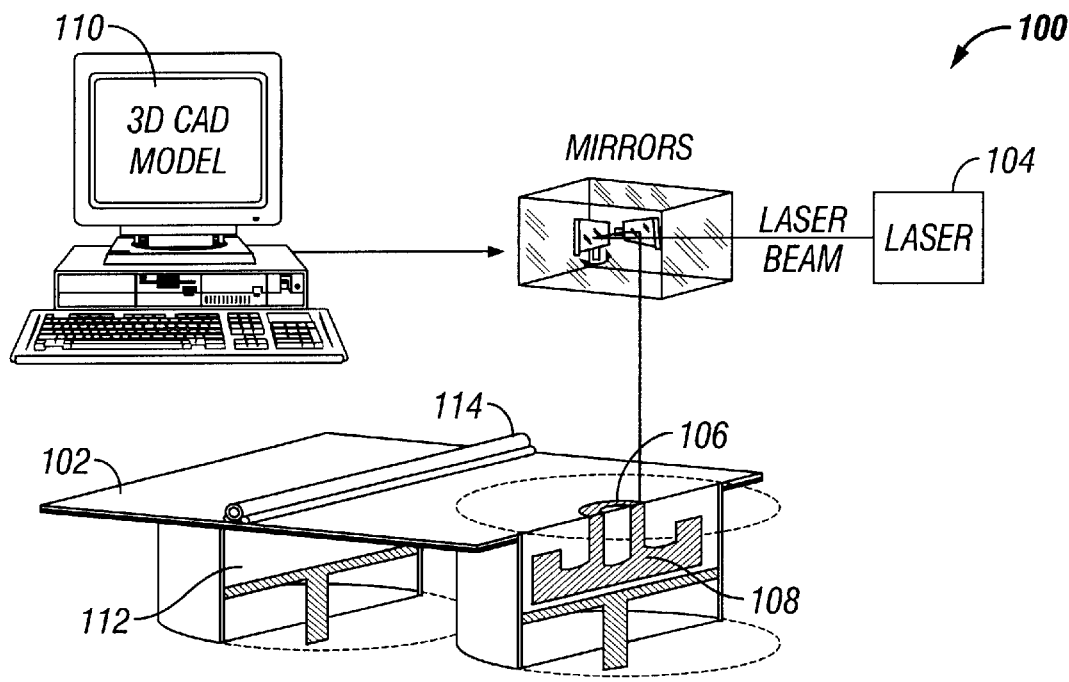
FIG. 1 illustrates a selective laser sintering (SLS) process.

A selective laser sintering (SLS) process 100 is illustrated in FIG. 1. The process 100 includes a thin, evenly distributed layer of powder 102. A laser 104 may then be used to sinter the powder 102 that is inside a cross-section 106 of the part 108. The cross-section 106 may be sintered according to a 3-D computer-aided design (CAD) model 110 of the prototype. The energy added by the laser 104 heats the powder 102 into a glass-like state and individual particles coalesce into a solid. Once the laser 104 has scanned.the entire cross-section 106, another layer of powder 102 is laid on top and the whole process is repeated. Additional powder is supplied from a powder storage 112, and is distributed with a roller 114.

Figure 2:
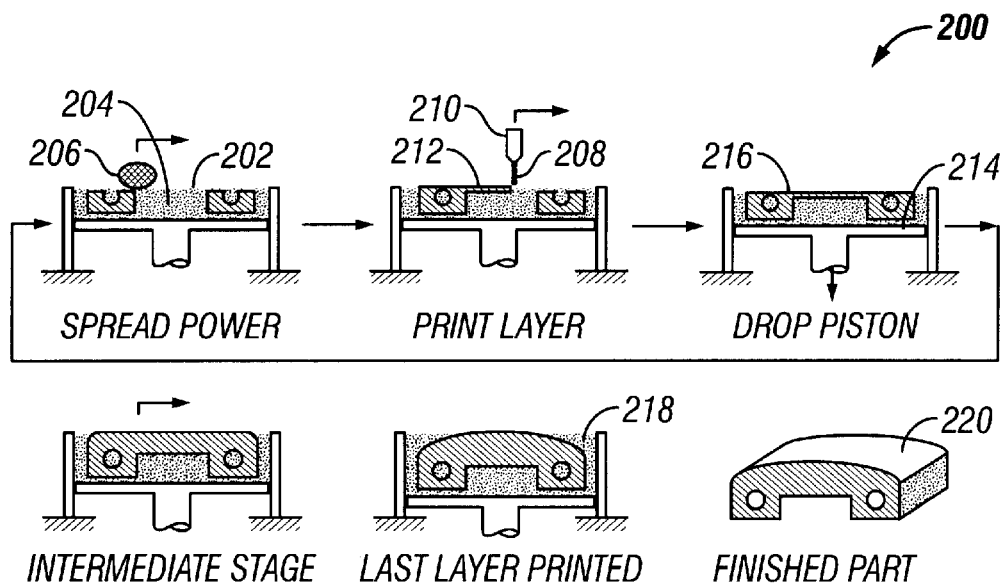
FIG. 2 shows a Three Dimensional (3-D) Printing process.

FIG. 2 shows a Three Dimensional (3-D) Printing process 200 that builds parts in layers. From a CAD model of the desired part, a slicing process draws detailed information for every layer. As shown in FIG. 2, each layer 202 is covered with a thin distribution of powder spread over the surface of a powder bed 204 by a roller 206. A piston 214 whose vertical position may be adjusted appropriately supports the powder bed 204 and the part-in-progress 216.

Using a technology similar to ink-jet printing, a binder material 208, such as super-glue, may be selectively deposited from a nozzle 210 to join particles 212 where the object is to be formed. The piston 214 is then moved down so that the next powder layer may be spread and selectively joined. This layer-by-layer process repeats until the part is completed. Following a heat treatment, unbound powder 218 is removed, leaving the fabricated part 220.

However, as described above, layer-by-layer selective bonding processes, such as SLS and 3-D Printing, may be time consuming and expensive. Sintering must be performed over the entire cross-section area of a given layer to properly bond powder material to the previous layer.

The present disclosure describes a selective inhibition of bonding process where bonding inhibitors are applied to certain areas of the powder layer. For example, the applied areas may be the boundaries of the cross-section area of an object. After application of the bonding inhibitors, the entire layer may be exposed only once to a bonding agent. The bonding agent may be either heat delivered to the powder surface by radiation sintering, or chemicals that result in various forms of bonding and adhesion of powder particles (e.g. balk bonding). Thus, the selective inhibition process offers advantages over the selective bonding process (e.g. SLS and 3-D Printing) where the bonding inhibitors are applied only to some selected areas of the powder layer. Sintering in the selective bonding process is required over the entire cross-section area. Therefore, the selective inhibit process may be performed significantly faster than the selective bonding process. Further, subjecting the entire powder layer to uniform heat, as opposed to subjecting a series of small areas under the beam for sintering, minimizes deformation. Accordingly, the selective inhibition of bonding process offers better dimensional control, reduced machine cost, and reduced fabrication time, than the selective bonding process.

Figure 3:
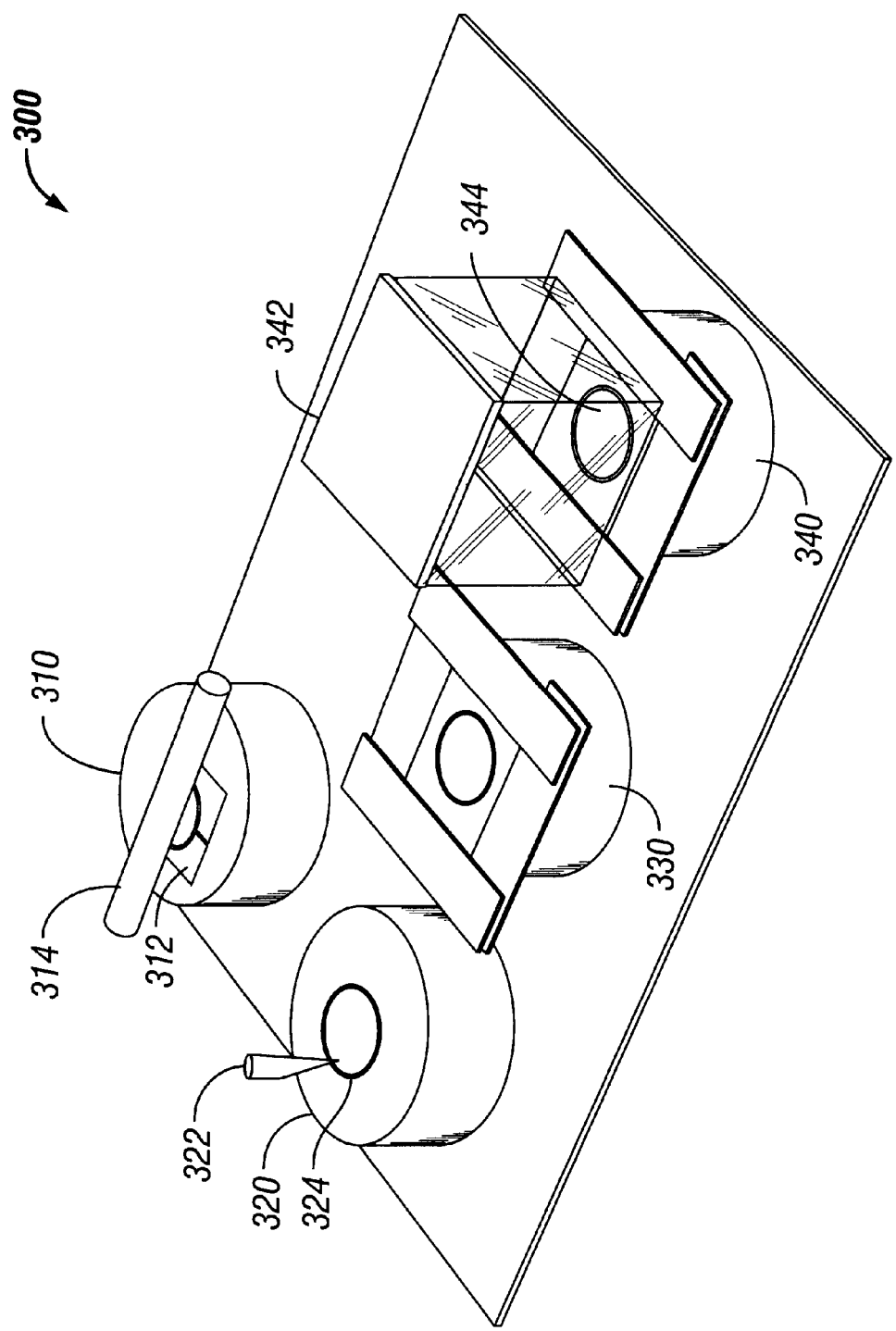
FIG. 3 illustrates a selective inhibition of bonding (SIB) in radiation sintering (SIB-RS) process in accordance with an embodiment of the present disclosure.

An embodiment of a selective inhibition of bonding in radiation sintering (SIB-RS) process 300 is illustrated in FIG. 3. The illustrated embodiment shows four steps 310, 320, 330, 340 in building each layer of a 3-D object using the SIB-RS process 300. The process 300 includes laying a thin powder layer 310, depositing a sintering inhibitor 320, and sintering the powder layer by radiation 340. The process 300 may also include devices that minimize an exposure frame 330 before the sintering step 340.

In the SIB-RS process 300, a thin powder layer 312 is laid using a roller 314. The roller 314 sweeps a horizontal surface slightly above the previous layer and carries the powder material in front. This sweeping motion is performed while rotating, such that the roller's front surface makes an upward motion. This approach 310 may create thin and uniformly dense powder layers 312.

The deposition of sintering inhibitor 320 involves using an extrusion nozzle with a fine orifice 322, such as an inkjet printer head. The nozzle 322 is used to deposit sintering inhibitor that prevents the selected areas of the powder layer from sintering under radiating heat. A typical profile 324 of printed deposition of the sintering inhibitor material is shown. The deposition of different types of sintering inhibitors is discussed in detail below.

In the illustrated embodiment, the sintering process 340 may involve using a radiating heat plate 342 to sinter the uninhibited areas 344 of the powder layer all at once. The selection of the radiating source 342 may depend on the material being sintered. Thus in an alternative embodiment, a radiating bar (e.g. a quartz heater tube) that is moved horizontally over the layer may be used. This approach permits the use of two exposure-insolating plates that dynamically move under the heat bar and expose only the necessary section of the heat bar as the heat bar traverses over the powder layer. Using a radiating bar also results in better conservation of the powder material, but may be slower than using a radiating plate.

Figure 4:
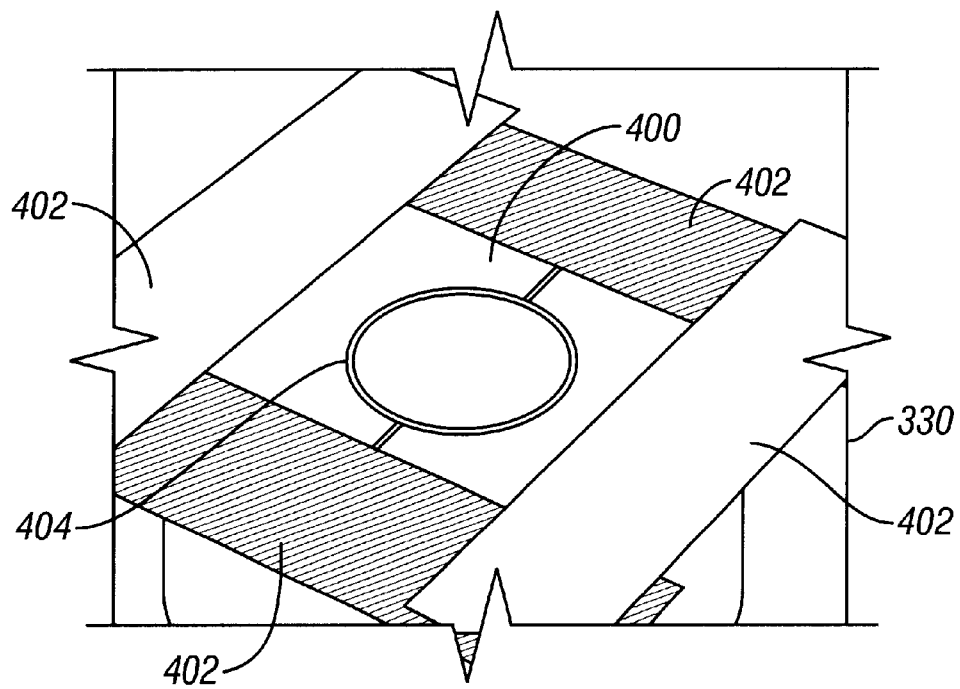
FIG. 4 shows an embodiment of a "minimizing an exposure frame" step of the SIB process.

The SIB-RS process 300 may further include a step 330 of minimizing an exposure frame 400 as shown in detail in FIG. 4. In the illustrated embodiment, the exposure frame 400 is minimized to conserve the powder material by laying insolating plates 402 that expose only the required portion of each layer to radiation. Without these plates 402 the entire powder base would be sintered. A computer may control the position of these plates 402. The position may be configured to be different for each layer, depending on the layer profile 404. In an alternative embodiment, a radiation panel having a matrix of discrete heating elements may be used. The heating elements on the radiation panel may each be independently activated such that a selected area of the powder layer is sintered.

Figure 5:
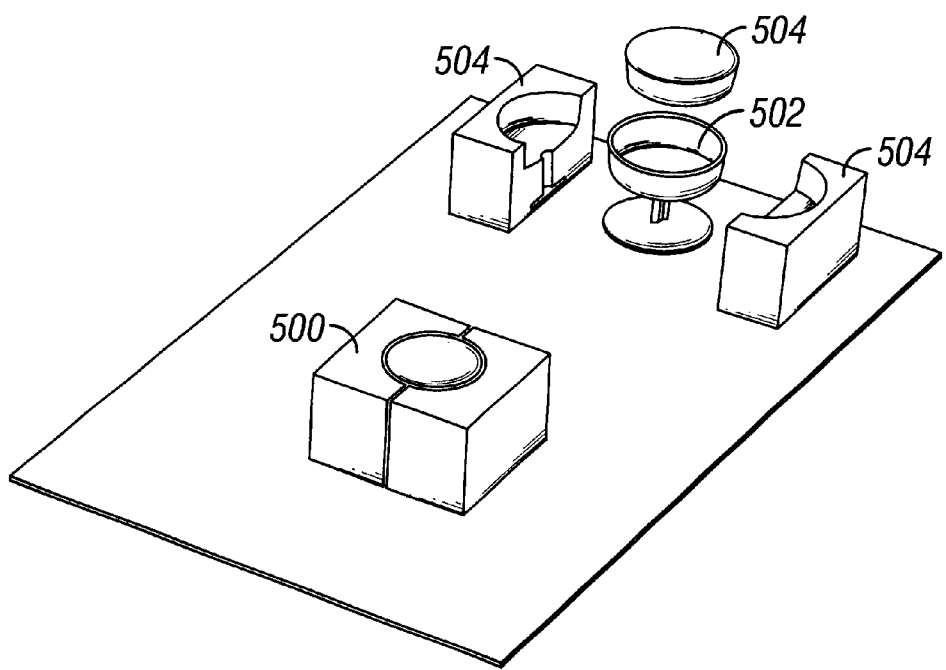
FIG. 5 shows an example of a solid 3-D object fabricated using the SIB process.

After all layers have been sintered 500, the final part 502 may be extracted as shown in FIG. 5. The un-sintered powder may be reused and the excess material 504 that is sintered may be crushed and recycled into a powder form.

Figure 6:
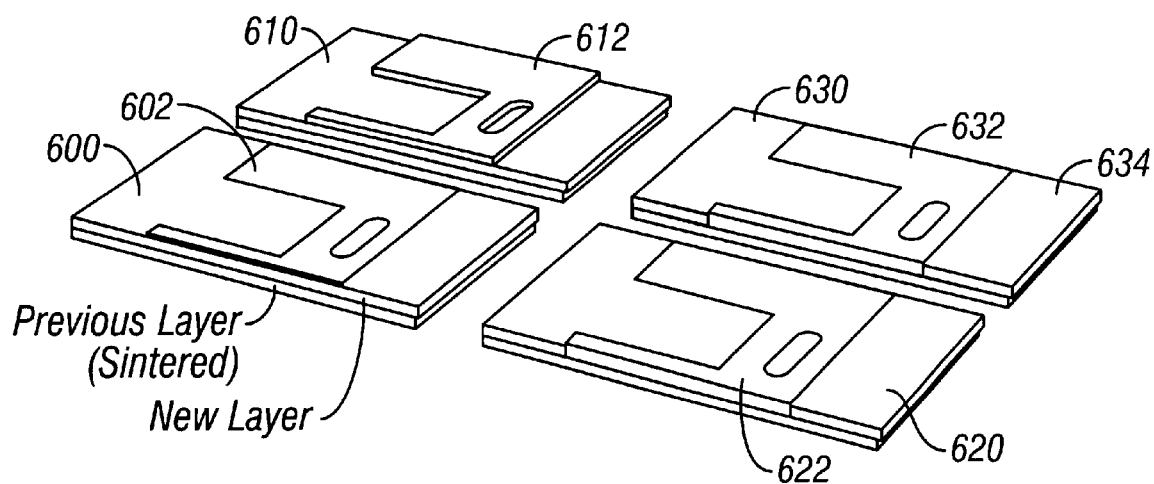
FIG. 6 shows different embodiments of a particle surface interference process.

As discussed above, the mechanisms for the deposition of the sintering inhibitor 320 may involve several different implementations. In some implementations, thermal insulation may allow the sintering inhibitor to prevent the powder from achieving the temperature necessary for bonding. In other implementations, particle surface interference provides the inhibitor to occupy the interstitial voids of the powder matrix. Particle surface interference further provides the inhibitor to produce a mechanical barrier to bonding. The first two methods described below are based on thermal insulation and the next two are based on particle surface interference (see FIG. 6).

In a first implementation 600, heat-reflective material is deposited. The heat-reflective material may include a heat reflective liquid 602 (e.g. the silver-color or metallic ink used in some ballpoint pens) that may be deposited to prevent the powder particles below from radiation. Alternatively, a fine iridescent powder material such as glitter may be deposited on desired areas to reflect radiation.

In a second implementation 610, heat-insolating material that may sustain heat is deposited on top of the selected areas of powder layer. The heat-insolating material prevents the powder particles below from sintering under radiation. For example, a heat-insolating material 612 such as ceramic powder, or ceramic slurry may be deposited over polymer powder (base material) to prevent the base material from sintering under radiation.

In a third implementation 620, anti-sintering agent is deposited. In this implementation 620, anti-sintering material that is deposited on the selected areas 622 of a powder surface penetrates the powder layer and surrounds the powder particles in the deposited region. This prevents the affected particles from bonding to one another in the sintering process.

Figure 7:
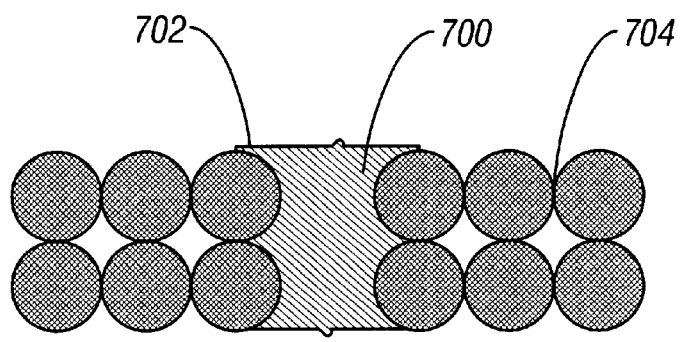
FIG. 7 shows an anti-sintering agent preventing powder particles from sintering under heat.

For example, the addition of a chemical that oxidizes metal powder particles in the selected areas prevents them from sintering. In case of polymer powder, certain liquids, such as alcohol and oil; when deposited on selected powder layer areas, may cover the affected particle surfaces and prevent them from sintering under heat (see FIG. 7). The sintering inhibitor liquid 700, when dried under heat, may bond 702 with surface of powder particles. This bonding 702, however, may be weaker than that made between sintered particles 704. Thus, the sintering inhibitor liquid may be dyed with the three basic colors and deposited on powder surface with a color inkjet printer system. This may produce fabricated 3-D parts that have outer surfaces in different colors.

In a fourth implementation 630, an isolating material is deposited. Unlike the other three implementations 600, 610, 620, the isolating material 632 is deposited on top of the sintered layer 634 in the form of an elevated 2.5-D shape that is as high as a layer thickness. When the base powder layer is then deposited, it only fills the areas not occupied by the isolating deposition. For example, the deposition may be thick ceramic slurry and base powder material may be polymer, metal, or ceramic with a lower sintering temperature than that of the slurry.

In an alternative embodiment to the third and fourth implementations, intermediate sintering process may be skipped for each powder layer. In this embodiment, the inhibitor pattern is added to each powder layer, a new layer is added, and the process is repeated until all layers are completed. The entire powder block is then placed in a sintering oven in which all powder particles (other than those affected by sintering inhibitor) are sintered.

For example, an oxidizing agent may be used for each layer of metal powder. After the completion of layering stages, a thin shell of oxide that contains and separates the 3-D part from the rest of the powder will separate the block of metal powder. Placing the entire metal powder block inside a sintering oven and sintering the entire powder volume results in solid pieces like the ones shown in FIG. 5.

Advantages provided by the alternative embodiment described above include the fact that the SIB machine does not incorporate a heater element. A conventional sintering oven may be used for the powder volume that is treated with the inhibitor pattern. This process is similar to the conventional powder metallurgy. However, it has the advantage of not requiring a mold.

An advantage of the SIB-RS process over the SLS process includes the fact that the machine based on SIB-RS may be much less expensive than the equivalent SLS machine because the high power laser generator is replaced with an inexpensive heat radiating plate. Other advantages include better dimensional integrity because the entire powder layer (and not localized sections) is treated with sintering heat sintering the entire layer at once. The limiting factor in speed is the inhibitor deposition process. However, using multi-jet print heads may increase the speed.

A selective inhibition of bonding using balk bonding (SIB-BB) provides an alternative approach to 3-D Printing. The 3-D Printing process is slow because the entire volume of the 3-D object has to be scanned, layer-by-layer, by the droplet deposition head. The SIB-BB process addresses this difficulty by significantly speeding the process by scanning only the boundary (and not the core) of each layer using a droplet deposition system that delivers the bonding inhibitor agent. The SIB-BB process inhibits some selected segments of each powder layer from bonding under a uniform droplet shower, which covers the entire surface of the exposed powder.

Building of each layer in the SIB-BB process is similar to that of the SIB-RS process explained in steps with respect to FIG. 3. A thin powder layer is provided in a similar manner. A bonding or adhesion inhibitor material may then be deposited in the selected areas of each layer that define the boundary 324 of the part in that layer. For example, the material may be wax or oil when water-based adhesives or bonding chemicals are used in the bonding step.

Once the bonding inhibitor material is deposited, a shower of small droplets of an adhesive or a bonding chemical is directed at the exposed surface of the powder layer. The uninhibited areas of the powder layer are bonded at this stage. In one embodiment, the deposition may be performed for the entire layer surface at once by a plate that covers the layer and has a matrix of droplet deposition holes. In another embodiment, the deposition may be performed by a row of droplet depositing holes that traverse over the powder layer.

After all layers have been treated with the bonding agent, the final part may be extracted in the same way as shown in FIG. 4. When wax is used as a bonding inhibitor, heating the finished block in an oven will result in easy separation of the 3-D part from the adjacent solids. Further, it is preferable to have the bonding agent create bonding by chemical reaction rather than by mere mechanical adhesion. This is true because the portion of the adhesive material that is deposited over the inhibitor material may make separation (as in FIG. 4) of adjacent solid segments difficult in the final stage. As an example of chemical bonding, the bonding agent may be water for a powder material like plaster of Paris or concrete. Oil or wax may be used as the bonding inhibitor in this case.

While specific embodiments of the invention have been illustrated and described, other embodiments and variations are possible. For example, although the bonding inhibitor on each layer is described as being deposited on the boundaries of the cross-section area, the bonding inhibitor on some layers may need to be extended from the boundaries to the edge of the exposure frame. The extensions allow the sintered parts to be broken out so that the designed object may be extracted.

All these are intended to be encompassed by the following claims.

What is claimed is:

1. A method for fabricating a three-dimensional (3-D) object, comprising:
   providing a layer of powder material;
   selectively depositing bonding inhibitor on selected areas of said layer of powder material, where said areas to be deposited with said bonding inhibitor are selected according to a cross-section design of said 3-D object;
   promoting bonding of uninhibited areas of said layer of powder material substantially simultaneously; and
   repeating said providing, selectively depositing and promoting bonding, until said 3-D object is formed.

2. The method of claim 1, wherein said depositing said bonding inhibitor includes depositing sintering inhibitor.

3. The method of claim 2, wherein said depositing sintering inhibitor includes using an extrusion nozzle with a fine orifice.

4. The method of claim 3, wherein said extrusion nozzle includes an inkjet printer head.

5. The method of claim 1, wherein said promoting bonding includes sintering of the uninhibited areas of the layer of powder material.

6. The method of claim 5, wherein said sintering includes heating an entire frame of the layer of powder material using a radiating heat plate.

7. The method of claim 5, wherein said sintering includes heating an entire frame of the layer of powder material by moving a radiating bar over the entire frame of the layer.

8. The method of claim 7, wherein said radiating bar includes a quartz heater tube.

9. The method of claim 7, wherein said radiating bar includes two exposure-insolating plates that move under heat bar and expose only a necessary section of the heat bar as the heat bar traverses over the layer of powder material.

10. The method of claim 5, further comprising:
    minimizing an exposure frame prior to said sintering to reduce an amount of the powder material used.

11. The method of claim 10, wherein said minimizing said exposure frame includes selectively providing insolating plates over the layer of powder material, such that said insolating plates expose only required portion of the layer to said sintering.

12. The method of claim 11, wherein positions of said insolating plates are adjusted for each layer according the cross-section design of said 3-D object.

13. The method of claim 10, wherein said minimizing said exposure frame includes providing a radiation panel having a matrix of discrete heating element.

14. The method of claim 13, wherein said heating elements in the radiation panel are independently activated such that a selected area of the powder layer is sintered.

15. The method of claim 4, wherein said sintering inhibitor includes a thermal insulation operating to prevent the powder material from achieving a temperature necessary for bonding.

16. The method of claim 15, wherein said thermal insulation includes heat-reflective liquid.

17. The method of claim 16, wherein said heat-reflective liquid is silver-colored or metallic ink.

18. The method of claim 15, wherein said thermal insulation includes an iridescent powder material.

19. The method of claim 18, wherein said iridescent powder material includes glitter.

20. The method of claim 15, wherein said thermal insulation includes a heat-insolating material.

21. The method of claim 20, wherein said heat-insolating material includes ceramic powder or slurry.

22. The method of claim 4, wherein said sintering inhibitor includes an anti-sintering agent that penetrates the layer of powder material and surrounds powder particles under areas deposited with said sintering inhibitor, to prevent the powder particles from bonding to one another.

23. The method of claim 22, wherein said anti-sintering agent includes alcohol.

24. The method of claim 22, wherein said anti-sintering agent includes oil.

25. The method of claim 1, wherein said promoting bonding of uninhibited areas includes showering droplets of bonding material on said uninhibited areas.

26. The method of claim 25, wherein said showering includes showering entire surface of said uninhibited areas substantially simultaneously with a plate that covers the entire surface.

27. The method of claim 25, wherein said showering includes depositing bonding material using a row of droplet depositing holes that traverse over the layer of powder material.

28. The method of claim 25, wherein said selectively depositing bonding inhibitor includes balk bonding by scanning the selected areas and delivering droplets of said bonding inhibitor to prevent said selected areas of the layer of powder material from bonding under said showering droplets of bonding material.

29. The method of claim 1, wherein said selectively depositing bonding inhibitor on selected areas of said layer of powder material includes depositing said bonding inhibitors only at boundaries of the cross-section design.

30. A method for fabricating a three-dimensional (3-D) object, comprising:

providing a layer of powder material;

selectively depositing sintering inhibitor on selected areas of said layer of powder material, where said areas to be deposited with said sintering inhibitor are selected according to a cross-section design of said 3-D object;

repeating said providing and selectively depositing, until entire programmed layers of the 3-D object has been deposited; and sintering said entire programmed layers of the 3-D object.

31. The method of claim 29, wherein said sintering inhibitor includes an oxidizing agent.

32. The method of claim 29, wherein said sintering said entire programmed layers includes heating said entire programmed layers of the 3-D object in a sintering oven.

33. An apparatus for fabricating a three-dimensional (3-D) object, comprising:

a first means for providing a layer of powder material;

a second means for selectively depositing bonding inhibitor on selected areas of said layer of powder material, where said areas to be deposited with said bonding inhibitor are selected according to a cross-section design of said 3-D object;

a third means for promoting bonding of uninhibited areas of said layer of power material substantially simultaneously; and a controller configured to integrate said first, second, and third means to form said 3-D object.

34. An apparatus for fabricating a three-dimensional (3-D) object, comprising:

a roller configured to provide a layer of powder material;

an extrusion nozzle adapted to selectively deposit bonding inhibitor on selected areas of said layer of powder material, where said areas to be deposited with said bonding inhibitor are selected according to a cross-section design of said 3-D object;

a radiating heat source configured to promote sintering of uninhibited areas of said layer of power material substantially simultaneously; and a controller configured to integrate said roller, extrusion nozzle, and radiating heat to form said 3-D object.

35. An apparatus for fabricating a three-dimensional (3-D) object, comprising:

a first means for providing a layer of powder material;

a second means for selectively depositing sintering inhibitor on selected areas of said layer of powder material, where said areas to be deposited with said sintering inhibitor are selected according to a cross-section design of said 3-D object;

a third means for sintering entire programmed layers of the 3-D object; and a controller configured to integrate said first, second, and third means to form said 3-D object.

36. An apparatus for fabricating a three-dimensional (3-D) object, comprising:

a roller configured to provide a layer of powder material;

an extrusion nozzle adapted to selectively deposit sintering inhibitor on selected areas of said layer of powder material, where said areas to be deposited with said sintering inhibitor are selected according to a cross-section design of said 3-D object;

a sintering oven configured to sinter entire programmed layers of the 3-D object; and a controller configured to integrate said roller, extrusion nozzle, and sintering oven, to form said 3-D object.

* * * * *